Figure 1:
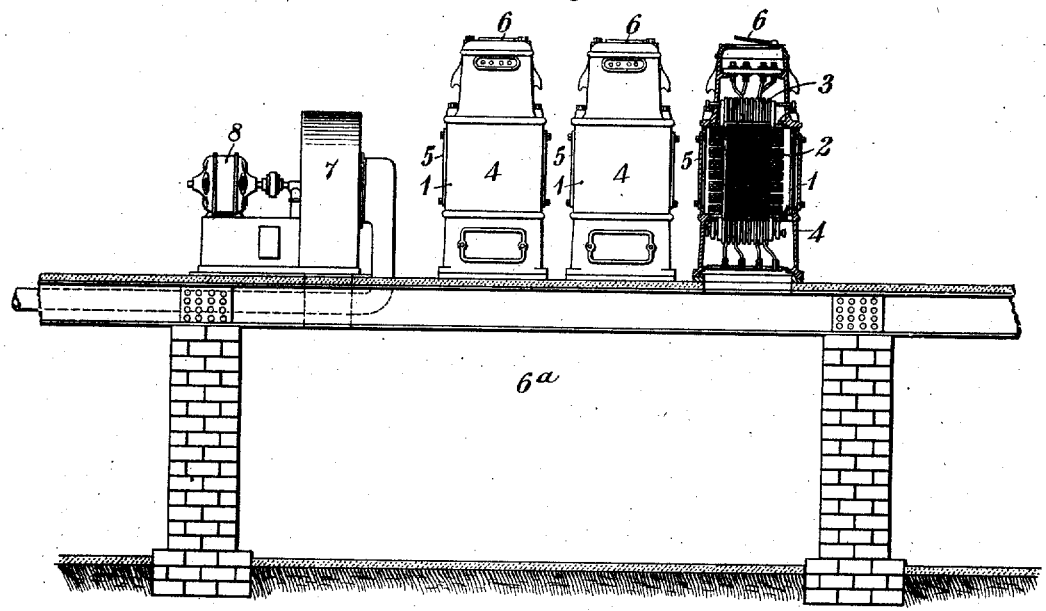

No. 853,375. PATENTED MAY 14, 1907.
K. C. RANDALL.
COOLING AND VENTILATING SYSTEM.
APPLICATION FILED MAY 2, 1906.

2 SHEETS—SHEET 1.

WITNESSES:
C. L. Belcher
R. P. Dearborn

INVENTOR
Karl C. Randall
BY
Shirley S. Lean
ATTORNEY

No. 853,375. PATENTED MAY 14, 1907.
K. C. RANDALL.
COOLING AND VENTILATING SYSTEM.
APPLICATION FILED MAY 2, 1906.

2 SHEETS—SHEET 2.

WITNESSES:
C. L. Belcher
R. J. Dearborn

INVENTOR
Karl C. Randall
BY
Chesley L. Carr
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COOLING AND VENTILATING SYSTEM.

No. 853,375.  Specification of Letters Patent.  Patented May 14, 1907.

Application filed May 2, 1906. Serial No. 314,873.

*To all whom it may concern:*

Be it known that I, KARL C. RANDALL, a citizen of the United States, and a resident of Edgewood Park, in the county of Allegheny and State of Pennsylvania, have invented a new and useful Improvement in Cooling and Ventilating Systems, of which the following is a specification.

My invention relates to cooling or ventilating systems and has special reference to the regulation of such systems as are adapted for use with electrical apparatus.

The object of my invention is to provide means for automatically regulating the amount of energy utilized for ventilating or cooling electric apparatus, that shall be simple in arrangement and dependent upon the amount of electric energy delivered from the apparatus and consequently indirectly dependent upon its temperature.

It is desirable to provide means for cooling or ventilating electrical apparatus in order that the insulation may not be overheated and destroyed and in order to keep the electrical performance and resistance normal. It is sometimes necessary, particularly in apparatus which is continually in service, not only to provide suitable ventilating passages through the structure of the apparatus but also to maintain forced ventilation by circulating a suitable cooling fluid through the electrically and magnetically active parts.

Transformers are often subjected to continuous service, and motor-driven ventilating fluid-propellers are sometimes employed for preventing abnormal rise in the temperature of the transformer windings and core. This propeller may force a suitable fluid, such as air, through ventilating ducts which are provided in the core or it may circulate a cooling medium through coils of pipe which may be located in any suitable insulating fluid which surrounds the transformer.

In order to regulate the degree of cooling action, I arrange the electric driving motor for the ventilating fluid-propeller so that its speed is automatically regulated as the amount of energy delivered from the electric apparatus varies. Since the heating of the transformer or other electrical apparatus is primarily dependent upon the load under which it is operated, the amount of cooling may easily be automatically varied to suit the conditions existing in the apparatus.

Figure 2:
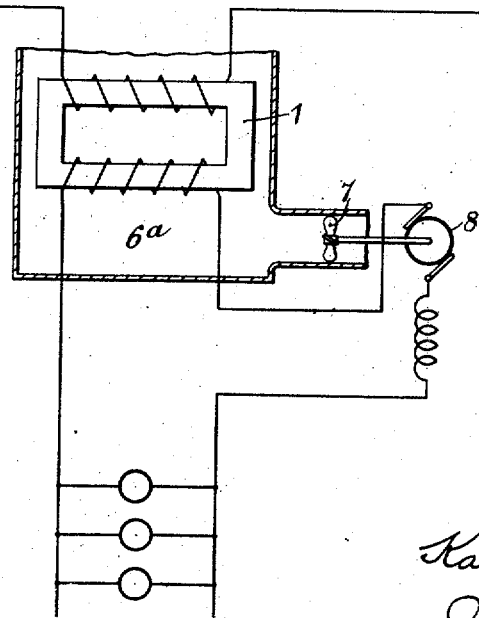
Figure 3:
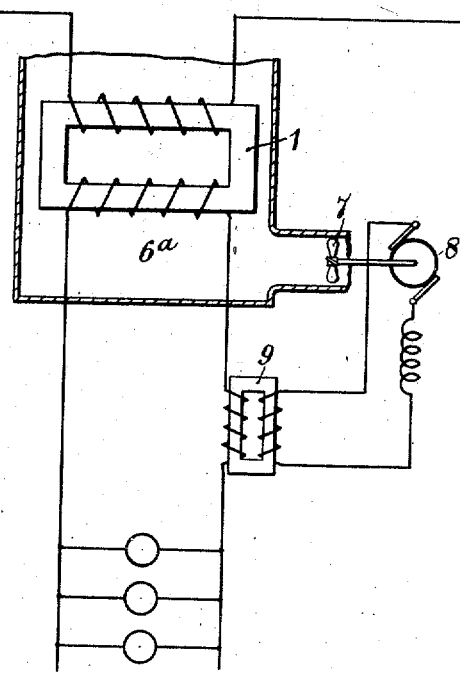
Figure 4:
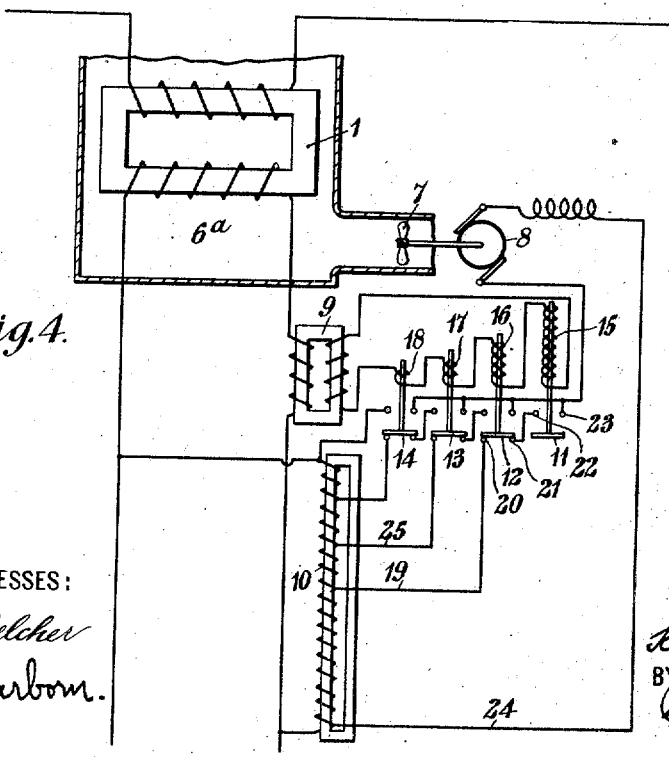

Figure 1 of the accompanying drawings is a view, partially in side elevation and partially in section, and Fig. 2 a diagram of a transformer cooling system arranged and regulated in accordance with my invention. Figs. 3 and 4 are diagrammatic views of similar cooling systems in which the control of the driving motor for the fluid-propeller is effected by modified means.

Referring to Figs. 1 and 2 of the drawings, transformers 1 comprise laminated core members 2 and windings 3 which are supported in inclosing casings 4 provided with side dampers 5 and top dampers 6. The core members are constructed of magnetizable laminæ which are separated at intervals by spacing or ventilating plates in order to provide air passages through the core. The bottoms of the casings are open and are connected with an air chamber 6ª into which cool air may be forced by an air propeller 7 rotated by an electric driving motor 8.

As illustrated in Fig. 2, the motor 8 is of the series type and is connected directly in series with the secondary circuit of the transformer. In this way, the speed of the motor is automatically varied when the transformer varies and consequently more or less air is forced through the transformer by the propeller 7, as it is needed. This arrangement is principally advantageous on account of its simplicity but is restricted in its application to relatively small transformers having low-voltage secondary circuits and the drop in potential occasioned by the motor may sometimes be prohibitive.

The motor may be connected according to various other methods, as illustrated in Figs. 3 and 4, in which the speed of the motor may be varied as the load on the transformer varies, irrespective of the voltage of the secondary circuits.

Referring specially to Fig. 3 a series transformer 9 is connected in the secondary circuit of the transformer 1 and the motor 8 is energized from the secondary of this transformer, so that the voltage applied to the motor is independent of the transformer voltage.

In Fig. 4 the motor 8 is supplied with energy from any suitable source, such as a transformer 10 which is connected across the secondary circuit of the transformer 1 and which is provided with a plurality of intermediate taps in its winding by which the voltage applied to the motor may be varied. The motor circuit is successively supplied from the several taps of the transformer 10 by means of switches 11, 12, 13 and 14. These switches are electrically-operated and are provided with magnet windings 15, 16, 17 and 18 which are connected in series and which are supplied with energy from the secondary of the series transformer 9. The magnet windings 15, 16, 17 and 18 have different numbers of turns so that a value of electric current which will operate the switch 11 is insufficient to operate any of the others. A slightly increased amount of current will operate the switch 12, a similar successive current increase being necessary to operate each of the switches 13 and 14. When the switches are all open, no energy is supplied to the motor 8 and as the load on the transformer is increased so that it becomes desirable to ventilate the transformer core and windings by forced draft, the increase in current traversing the secondary of the transformer 9 will be sufficient to energize the winding 15 and to close the switch 11. When this switch is closed, energy is supplied from an intermediate tap 19 of the transformer 10, through contact fingers 20 and 21 of the switch 12 which is open, and through contact fingers 22 and 23 of the switch 11, to the motor 8, circuit being completed through an opposite line conductor 24. This connection will be maintained until the load on the transformer is decreased so that the switch 11 is opened or is increased so that the switch 12 is closed. As the switch 12 is closed, circuit from the intermediate tap 19 is interrupted and a circuit of slightly higher voltage from an intermediate tap 25 is completed through the switches 13 and 12 and the speed of the motor is correspondingly increased. The voltage applied to the motor may be still further increased in a similar manner by the closing of the switches 13 and 14.

In all the arrangements illustrated, the speed of the motor which drives the fluid-propeller is dependent upon the amount of energy taken from the secondary of the transformer, consequently the cooling effect which is effected by the propeller is automatically regulated to maintain a substantially constant temperature, since the tendency for the coils and core to heat is dependent upon the current traversing the transformer coils.

Although I have shown several systems involving automatic regulation, the use of my invention is not restricted to the arrangement shown, but those skilled in the art will find no difficulty applying its principles to various other uses and I desire that only such limitations shall be imposed as are indicated in the appended claims.

I claim as my invention:

1. The combination with electrical apparatus from which energy is delivered, and cooling means therefor, of means for automatically regulating the amount of cooling in accordance with the amount of energy delivered.

2. The combination with apparatus from which electrical energy is delivered and cooling means therefor, of means for automatically regulating the amount of cooling in accordance with the amount of current delivered.

3. The combination with transformers for electric energy and a ventilating fluid circulator for cooling the transformers, of means for regulating the energy supplied to the circulator for ventilating purposes in accordance with the value of electric current delivered.

4. The combination with transformers for electric energy and a motor-driven fluid circulator for cooling the transformers, of means for automatically regulating the speed of the motor in accordance with the amount of energy delivered from the transformers.

5. The combination with transformers for electric energy and an electric motor-driven fluid circulator for cooling the transformer, of means for automatically regulating the speed of the electric motor in accordance with the amount of energy delivered from the transformers.

6. The combination with air cooled electric apparatus, an air propeller and an electric driving motor therefor, of means for automatically regulating the speed of the motor in accordance with the amount of current delivered from the apparatus.

7. The combination with air cooled transformers for electric energy and an air propeller therefor, a driving motor for the propeller, of means for supplying energy to the motor in accordance with the amount of energy delivered from the transformers.

8. The combination with air cooled transformers, air propellers therefor and electric driving motors for the propellers, of means for automatically regulating the speed of the motors in accordance with the amount of energy delivered from the transformers.

9. The combination with transformers for electric energy and a motor-driven fluid circulator for cooling the transformers, of means for automatically regulating the speed of the motor that is dependent upon the energy delivered from the transformers and comprises a regulating transformer, a plurality of relay switches which determine the voltage applied to the motor and are severally controlled by dissimilar electro-magnet coils energized by the current traversing the transformer windings.

10. The combination with transformers for electric energy and an electric motor-driven fluid circulator for cooling the transformers, of means for automatically regulating the speed of the electric motor that is dependent upon the energy delivered from the transformers and comprises a regulating transformer, a plurality of relay switches which determine the voltage applied to the motor and are severally controlled by dissimilar electro-magnet coils energized by the current traversing the transformer windings.

11. The combination with air cooled electric apparatus, an air propeller and an electric driving motor therefor, of means for automatically regulating the speed of the motor that is dependent upon the current delivered from the apparatus and comprises a regulating transformer, a plurality of relay switches which determine the voltage applied to the motor and are severally controlled by dissimilar electro-magnet coils energized by the current traversing the transformer windings.

12. The combination with air cooled transformers for electric energy and an air propeller therefor, a driving motor for the propeller, of means for supplying energy to the motor that is dependent upon the energy delivered from the transformers and comprises a regulating transformer, a plurality of relay switches which determine the voltage applied to the motor and are severally controlled by dissimilar electro-magnet coils energized by the current traversing the transformer windings.

13. The combination with air cooled transformers, air propellers therefor and electric driving motors for the propellers; of means for automatically regulating the speed of the motors that is dependent upon the energy delivered from the transformers and comprises a regulating transformer, a plurality of relay switches which determine the voltage applied to the motor and are severally controlled by dissimilar electro-magnet coils energized by the current traversing the transformer windings.

In testimony whereof, I have hereunto subscribed my name this 30th day of April, 1906.

KARL C. RANDALL.

Witnesses:
J. S. WILLIAMS,
BIRNEY HINES.